United States Patent
Diels et al.

(12) 
(10) Patent No.: US 6,355,172 B1
(45) Date of Patent: Mar. 12, 2002

(54) METHOD AND PLANT FOR PURIFICATION OF METALS FROM WATER

(75) Inventors: Ludo Diels, Oelegem; Sandra Van Roy, Mol, both of (BE); Piet Hein Spaans, Schagen (NL); Hans Wouters; Annette Kramer, both of Leerdam (NL)

(73) Assignee: Vlaamse Instelling Voor Technologisch Onderzoek (VITO), Mol (BE)

( * ) Notice: Subject to any disclaimer, the term of this patent is extended or adjusted under 35 U.S.C. 154(b) by 0 days.

(21) Appl. No.: 09/298,002

(22) Filed: Apr. 22, 1999

(30) Foreign Application Priority Data

Apr. 23, 1998 (EP) .............................................. 98870091

(51) Int. Cl.$^7$ ................................................. C02F 3/00
(52) U.S. Cl. ........................ 210/610; 210/618; 210/616; 210/902
(58) Field of Search ................................ 210/605, 616, 210/617, 609, 702, 610, 614, 902, 618

(56) References Cited

U.S. PATENT DOCUMENTS

| | | | |
|---|---|---|---|
| 4,021,368 A | | 5/1977 | Nemec et al. |
| 4,519,912 A | | 5/1985 | Kauffman et al. |
| 4,592,837 A | * | 6/1986 | Ludwig et al. |
| 4,662,900 A | * | 5/1987 | Ottengraf |
| 4,793,929 A | | 12/1988 | Kichuth et al. |
| 4,826,602 A | | 5/1989 | Revis et al. |
| 5,055,402 A | | 10/1991 | Greene et al. |
| 5,077,025 A | * | 12/1991 | Glass |
| 5,279,745 A | | 1/1994 | Jeffers et al. |
| 5,308,586 A | * | 5/1994 | Fritsche et al. |
| 5,443,729 A | | 8/1995 | Sly et al. |
| 6,153,094 A | * | 11/2000 | Jowett et al. |
| 6,203,703 B1 | * | 3/2001 | Yerushalmi |

FOREIGN PATENT DOCUMENTS

| | | |
|---|---|---|
| DE | DD 298766 | 3/1992 |
| DE | DD 255153 | 3/1999 |
| EP | 0 333 218 | 9/1989 |
| EP | 0 590 706 | 4/1994 |
| EP | 0 730 895 | 9/1996 |
| FR | 2626868 | 8/1989 |
| WO | WO81/02308 | 8/1981 |
| WO | WO95/00447 | 1/1995 |
| WO | WO95/23767 | 8/1995 |

OTHER PUBLICATIONS

Remacle, J., Houba, C.: "Uptake of heavy metals from industrial effluents by microorganisms developed in a biological fluidezed bed" INTERNATIONAL CONFERENCE–HEAVY METALS IN THE ENVIRONMENT.., HEIDELBERG, GERMANY, 1983, pp. 936–939, XP002077683 CEP Consultants LTD, Edinburgh, Scotland.

European search Report dated Sep. 16, 1998 for application NOEP 98 87 0091.

* cited by examiner

Primary Examiner—Chester T. Barry
(74) Attorney, Agent, or Firm—Merchant & Gould P.C.

(57) ABSTRACT

The present invention is related to a purification method metal(s) containing water wherein:
- the process is fully continuous,
- the water flows through a sand filter, inoculated with viable micro-organisms,
- a part of the micro-organism biomass, loaded with metals, is evacuated, and
- the micro-organism biomass loss is equal to the micro-organism biomass growth.

8 Claims, 2 Drawing Sheets

FIG. 3
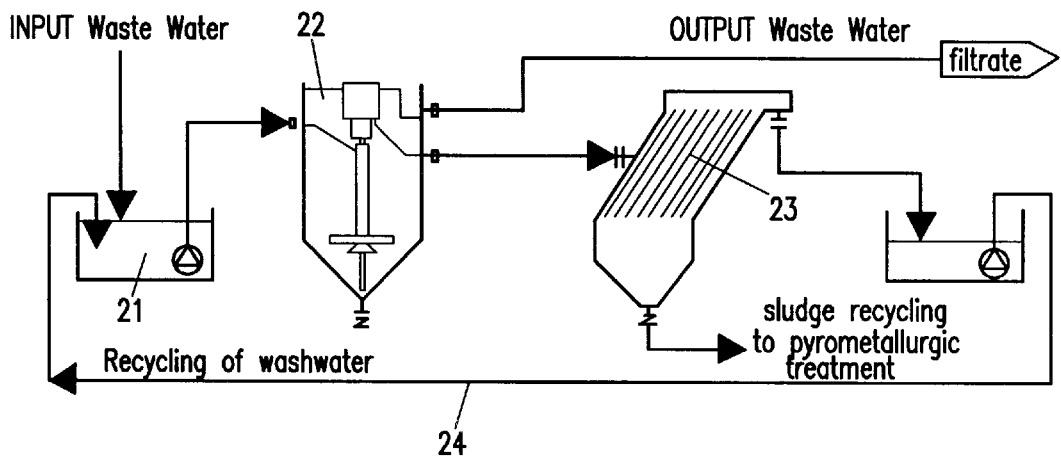
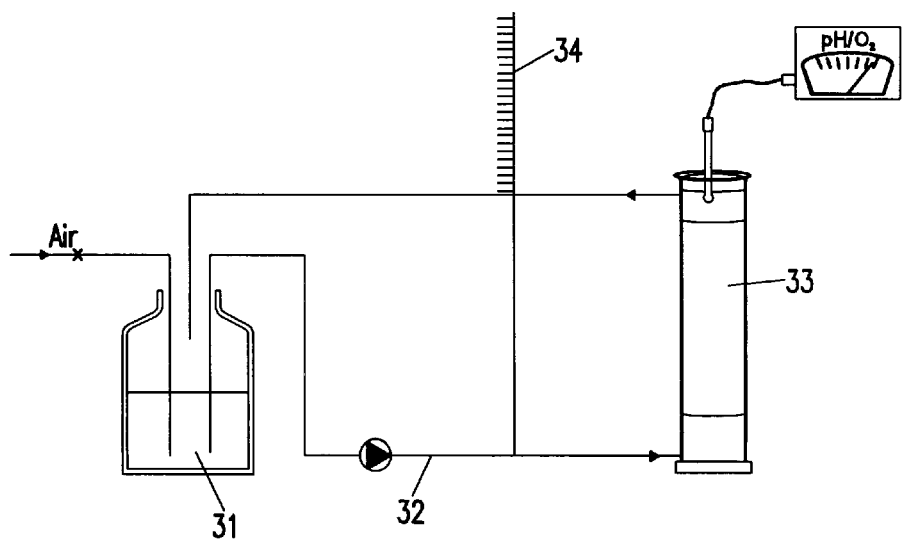
FIG. 4

METHOD AND PLANT FOR PURIFICATION OF METALS FROM WATER

FIELD OF THE INVENTION

The present invention is related to a purification (removal and/or recovery) method and plant of metal(s) from waste water (aqueous media) by using a moving bed reactor inoculated with metal biosorbing and/or bioprecipitating and/or biotransforming bacteria.

The present invention is also related to a method to maintain a live bacterial population in a continuously operating sand filter, as wall as to a method whereby the metal(s) can be recovered from the produced metal laden biomass.

BACKGROUND OF THE INVENTION

Metal containing waste waters are obtained from metal recycling or processing companies (non-ferrous) as well as surface treatment companies (galvanisation).

Surface treatment companies recycle 70–80% of the metal containing waste water. The remaining 30–20% must be treated and the metal removal is quite difficult due to the complexing properties of some organic compounds, causing high discharge costs.

Due to the strengthening of environmental standards, problems arise with the removal of trace concentrations (few ppm's) possibly being complexed or added with organic contaminants.

These environmental problems urge for a simple system and regeneration technology which advantageously reduces sludge volumes for either metal recycling or final disposal.

The following table 1 give an estimation of the minimum amount of the metals Cu, Pb and Zn entering in the European surface waters if the present German standards were used by the European Union.

TABLE 1

Estimation of heavy metal discharge in Western Europe from metal processing activities
Based on allowable contaminant per ton produced

| Metal | Production (ton/year) | Standard (1) (g metal/ton produced) | Total metal discharge (ton/year) |
| --- | --- | --- | --- |
| Cu | 1,200,000 | 10 | 12 |
| Pb | 1,400,000 | 15 | 21 |
| Zn | 1,700,000 | 30 | 51 |

(1): Allowed contaminant discharge in Germany.

Normally volumes to be treated are in the order of magnitude between 25 and 200 m$^3$/h for mining and metal processing plants and between 4 and 30 m$^3$/h for surface treatment plants.

Physico-chemical methods like precipitation and electrolytical metal removal are difficult to apply or too costly for use at the given low concentrations. Ion exchange techniques are often inhibited by the presence of organic contaminants and is a relatively costly technique.

Different "classical" biological methods for cleaning heavy metals containing water have been proposed, like the use of helophytes as described in the US Patent U.S. Pat. No. 4,793,929.

Biosorption and bioprecipitation of metals have been described extensively (e.g. U.S. Pat. No. 5,055,402 and U.S. Pat. No. 5,279,745). In the biosorption technique, metals are bonded to functional groups on the cell surface polymers of the biomass. The bioprecipitation technique implies the crystallisation of heavy metals at the cellular surface. These processes can be performed with dead and/or structurally modified micro-organisms as described in the US Patent U.S. Pat. No. 4,021,368.

The nature of biosorption and bioprecipitation methods implies that the regeneration of the biomass is necessary.

STATE OF THE ART

The European Patent Application EP-0333218 describes a process for the removal of transition metals ions from aqueous solutions, which comprises the step of growing water fern Azolla in such solution until a substantial percentage of the initial metal ions content is taken up by the growing fern. About 80% of the water content of the fern can be mechanically removed and will contain no more than 1 to 1.5% of the accumulated metal content. The remainder of the metal remains bound in the biomass and can be recovered.

The International Patent Application WO95/23767 is related to a method and apparatus for processing water contaminated by organic compounds in a biologically activated and continuously operating granular filter bed. However, in said apparatus and method, the medium is not washed. Therefore, no separation of washwater containing biomass is performed. In addition, the turbulent transport of the filter medium from bottom up to the top surface of the filter bed reduces the bacterial stock in such a substantial way that the reactivity of the filter bed is noticeably deteriorated. This can be prevented by providing several transport units which do not cause a too important loss of the bacterial stock and thereby do not affect the reactivity of the filter bed. These several transport units are gas lifts as described in the International Patent Application WO95/00447.

The International Patent Application WO95/00447 describes an air-lift used to transport vertically a suspension constituted of particles of varying sizes, which will prevent the micro-organism strains from being decimated to an extend which will appreciably affect the effectiveness of the water purification process. This gas lift consists of the use of two or more transport tubes in parallel. The quantity of material transported in the individual transport tubes will be limited to a value at which reactivity is not impaired appreciably by excessive wearing away of the bacteria strains.

The International Patent Application WO81/022308 is related to a process and apparatus for converting organic materials in a micro-biological process under gas generation. In said method and apparatus, the conversion takes place in a continuous aqueous phase where a substrate for the micro-organisms is supplied to a moving bed of inorganic granular materials. However, the above-described method and apparatus are only related to the conversion of organic materials by micro-organisms, and these documents do not teach that it is possible to convert these techniques to a biological treatment of metals containing waste waters.

The U.S. Pat. No. 4,826,602 describes a process for reducing the concentration of ionic species of heavy metals in an aqueous waste solution. Said process comprises the step of contacting the waste solution with a culture of *Pseudomonas maltophilia* (ATCC 53510) in the presence of an amount of nutrient medium sufficient to satisfy the nutritional requirements of said bacteria. Said document also discloses the use of said technique in a "continuous process" which will not solve the above mentioned drawbacks when one applies said process in a continuous way. Any reactor used for such a purpose will need regeneration, and since no solution is provided for a continuous regeneration of the reactor while the amount of micro-organisms remains stable, said process can not be considered as a fully continuous process.

The U.S. Pat. No. 4,519,912 is related to a process for reducing (among others) the concentration of heavy metals species in an aqueous solution. The heavy metals of said solution are converted from soluble elements to insoluble elements which can be retained on a porous matrix being a support of anaerobic bacteria. Said heavy metals are then after recovered from the matrix.

More specifically, it is difficult to obtain by the processes of the state of the art a truly continuous process in the treatment of heavy metals containing waste waters. Indeed, said processes of the state of the art are mainly "semi-continuous", which means that the amount of living micro-organisms is not maintained constant during the whole process and that a reactivation of the reactors with micro-organisms is necessary.

Therefore, the processes and apparatus of the state of the art need the use of several reactors working in parallel for the treatment of said metals containing waste waters.

As already mentioned biomass can be used for the removal of metals from water by biosorption (binding of metals to functional groups on the cell surface polymers) and bioprecipitation (crystallisation of metals at the cellular surface) processes. Several industrial processes based on said techniques were developed under the names BioFix beads®, AlgaSorb®, AMT-Bioclaim® systems. Testing of such immobilised biomass systems revealed several problems. The metal removal efficiency increases with increased concentrations of biomass. This indicates a need for large amounts of biomass. After saturation of the biomass, a regeneration with weak acids is necessary. The regeneration time increases with the biosorption cycles. Also, a complete regeneration is not possible after some cycles, which will therefore result in a decreased efficiency. In addition, either some metals cannot be removed, or some biomass is destroyed.

AIMS OF THE INVENTION

The present invention aims to provide a purification (removal or recovery) method and plant of metals containing aqueous media which do not present the drawbacks of the state of the art.

A main aim of the invention is to provide such a continuous method and plant (working in a continuous way) and which do not need a reactivation of the reactor with micro-organisms during the purification process.

Another aim of the invention is to provide a process and plant which do not need the parallel use of several reactor vessels.

A further aim of the invention is to provide such a method and plant wherein few or nor waste is generated, which do not require the conception of large amounts of chemicals for the purification, which are simple, easy to use and not expensive.

SUMMARY OF THE INVENTION

The present invention concerns a continuous purification (removal or recovery) method of metal(s) containing water wherein the water flows through a moving bed reactor which has been inoculated with viable micro-organisms, wherein a part of the micro-organism biomass, laden with said metals, is evacuated and wherein the biomass loss is maintained essentially equal to the biomass growth.

In the method according to the present invention, the supporting material of the moving bed reactor can be recirculated. The recirculation of the supporting material is preferably modified according to the micro-organism biomass growth.

According to the invention, said moving bed reactor is preferably a moving bed granular filter, and advantageously an AstraSand filter, as described in e.g. EP-A-0 730 895 and EP-A-0 590 705.

In said process, the natural biomass growth is regulated with means comprising feed for the micro-organism biomass and having one or more constituents selected from the group consisting of nitrogen source, carbon source, phosphate source, calcium source, sodium source, . . .

Advantageously, the purification method of metal(s) containing water according to the invention is obtained by biosorption or precipitation of the metals which will adsorb in a biofilm on the supporting granular medium (e.g. sand).

According to a preferred embodiment of the present invention, the micro-organisms are strains selected from the group consisting of *Alcaligenes eutrophus* CH34, *Alcaligenes eutrophus* ER121, *Pseudomonas mendocina* AS302, *Citrobacter* sp. N14, *Arthrobacter* sp. BP7/26 and BP7/15, *Methylobacillus* MB127 or a mixture thereof and already described in the literature.

According to another embodiment of the present invention, the method further comprises a biotransformation step.

The present invention is also related to the plant (or apparatus) for the continuous purification of metal(s) containing water based upon the method according to the invention.

BRIEF DESCRIPTION OF THE DRAWINGS

In FIG. 3, a flow sheet of an embodiment of the invention is shown.

In FIG. 4, a filter device used for lab filtration experiments is depicted.

DETAILED DESCRIPTION OF THE INVENTION

The industrial benefits of the inoculated moving bed granular filters are:
- the metals can be accumulated in a small volume, which makes the metal recovery and sludge handling easier;
- no waste will be generated because the metal laden sludge coming out of the system will be recycled in metal processing industries;
- the treated waste water can be reused in the production process; the total volume of water to be recycled can be increased with a reduction of the total consumption of process water.
- the proposed treatment system does not imply the consumption of large amounts of chemicals and consumes little extra energy;
- the proposed system is versatile in operation, easy to maintain and applicable for reasonable investment costs;

the reuse of metals reduce discharge taxes and improves water quality.

Figure 1:
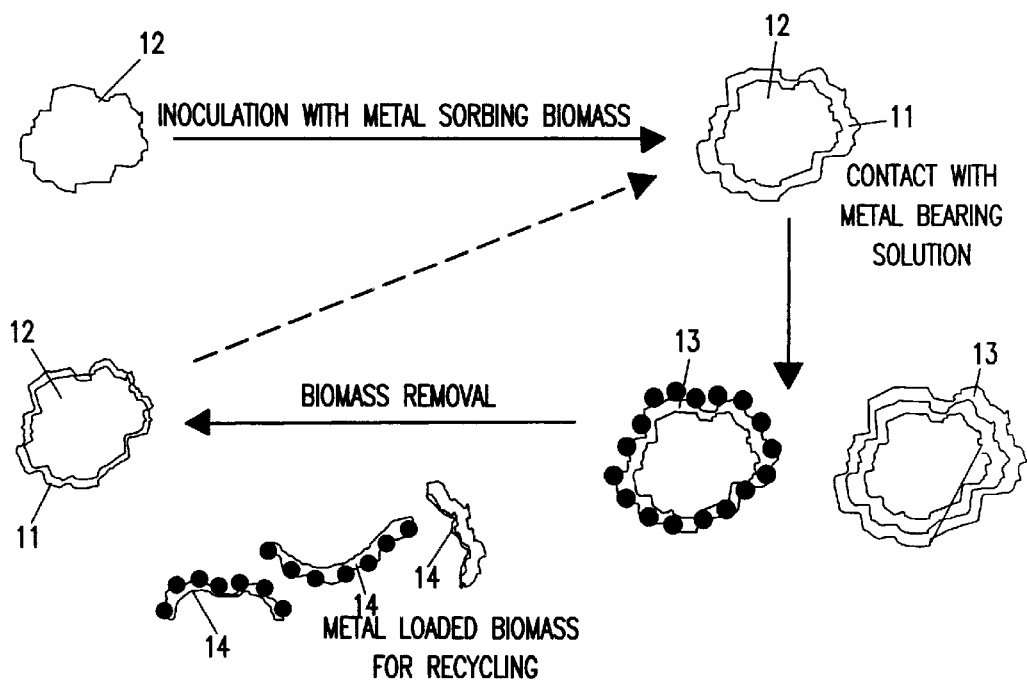
In FIG. 1, the overall concept of the process is drawn.
Figure 2:
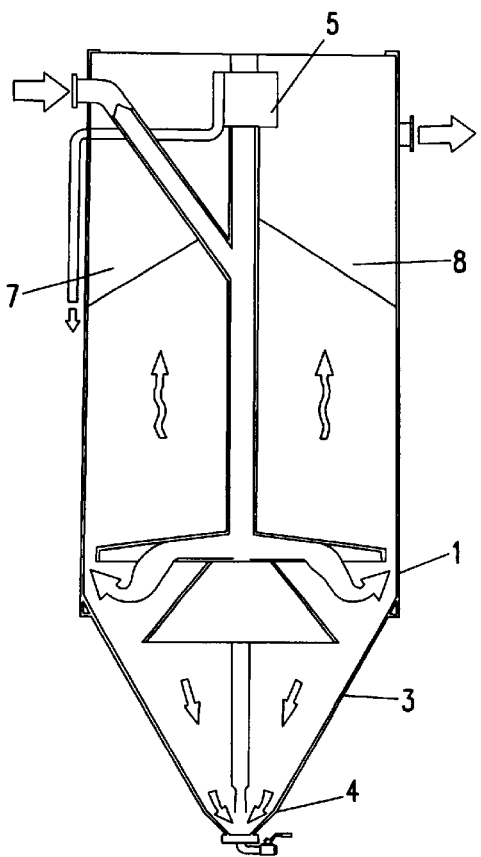
In FIG. 2, a moving bed granular filter device is disclosed.

The FIG. 1 represents the overall concept of the method and plant according to the invention. Bacteria able to biosorb or precipitate metals grow in a biofilm 11 on a supporting granular medium 12. During contact with metal containing waste water the biofilm 11 adsorbs the metals 13. Afterwards the metal laden biomass 14 is partly removed from the granular medium in such a way that the removed biomass balances the growth.

The feed water is treated in a moving bed granular filter, which typically consists of a cylindrical upper and conical shaped lower vessel, containing a granular medium 3 (e.g. sand) and a centrally positioned internal, composed of a gas lift 4, a washer device 5 and a feed water distributor 1. The feed water is flowing through the filter bed in upward direction, during which the metals are removed by biosorption and bioprecipitation.

The biomass growth in the filterbed is balanced by a continuous controlled washing of the granular medium 3. This washing action consists of a turbulent upward transport of laden medium through the gas lift 4 by introducing compressed gas in the gas lift 4 and a countercurrent washing of the medium in the upper washing device 5. As a result the filterbed is in constant downward motion. The metal laden biomass is discharged through the wash water outlet 7, while the washed granular medium is recycled to the top of the filter bed 8.

Thus, water purification and granular medium washing both take place continuously, enabling the filter to remain in service without interruption. The amount of granular medium which is washed per unit of time is typically controlled by (indirect) measuring the amount of biomass which is present in the filterbed. Reference is made to NL 1005013 A, in which the filter control is introduced.

The complete water treatment system is shown in FIG. 3. Waste water 21 is pumped through the moving bed granular filter 22 and purified. The wash water, containing the metal loaded biomass, is drained to a lamella separator 23. The water, coming from the lamella separator, is reintroduced in the sand filter (24). The sludge (wash water+metal laden biomass), is, possibly after dewatering, preferably recycled in a pyrometallurgic treatment facility.

Further, biotransformation can also take place in this method. Specific micro-organisms can perform a biotransformation of a specific contaminant in water, whereby the contaminant is transformed into a harmless, economically important or more easily removable product. This biotransformation can take place before or after, but preferably during the flowing of the water through a moving bed reactor.

EXAMPLE 1

Bacteria were screened for metal biosorbing or bioprecipitating capacity. Also the survival of these bacteria in heavy metal bearing waste water was tested. According to the invention, the preferred strains were selected:

Alcaligenes eutrophus CH34 (7)
Alcaligenes eutrophus ER121 (8)
Pseudomonas mendocina AS302 (9)
Citrobacter sp. N14 (10)
Arthrobacter sp. EP7/26 and EP7/15 (11)
Methylobacillus MB127 (12).

The metal biosorbing capacity for U, Y, Ni, Ag and Pd at two equilibrium concentrations (20 and 200 mg/l) is presented in table 2.

TABLE 2

Metal binding capacity of selected strains at two equilibrium concentrations

| Metal | $C_o$ (mg/l) | BP7/26 | BP7/15 | CH34 | ER121 | AS302 | MB127 |
|---|---|---|---|---|---|---|---|
| Ag | 20 | 47 | 21 | 27 | 34 | 34 | 71 |
|    | 200 | 102 | 72 | 59 | 79 | 75 | 98 |
| Ni | 20 | 4 | 4 | 7 | 3 | 10 | — |
|    | 200 | 7 | 7 | 12 | 7 | 22 | — |
| U  | 20 | 69 | 76 | 70 | 39 | 100 | 33 |
|    | 200 | 115 | 140 | 121 | 57 | 210 | 52 |
| Pd | 20 | 67 | 66 | 73 | 63 | 73 | 44 |
|    | 200 | 70 | 80 | 94 | 85 | 108 | 84 |
| Y  | 20 | 4 | 8 | 13 | 8 | 11 | 15 |
|    | 200 | 22 | 21 | 34 | 19 | 38 | 23 |

EXAMPLE 2

Columns containing sand, basalt or garnet were inoculated with the mentioned strains and percolated with a solution of 12 ppm Zn. The installation is shown in FIG. 4. It comprises a reservoir 31, a peristaltic pump 32, a granular filter 33 and a piezometric tube 34. The results are presented in table 3.

From the results it could be concluded that single strain inoculation already leads to a metal reduction to below 0.1 ppm.

TABLE 3

Output concentration of Zn after percolation of differently inoculated granulated filters

| Granulated filter inoculation | Output of Zn (ppm) |
|---|---|
| CH34 (basalt) | 0.2 |
| N14 (basalt) | 0.3 |
| BP7/26 (basalt) | 0.1 |
| MB126 (basalt) | 0.1 |
| AS302 (basalt) | 0.2 |
| AS302 (sand) | 1.7 |
| AS302 (garnet) | 3.3 |

EXAMPLE 3

Inoculation of the Sand Filter

Bacteria that are able to biosorb or bioprecipitate (Alcaligenes eutrophus CH34, Alcaligenes eutrophus ER121, Pseudomonas mendocina AS302 and Arthrobacter sp. BP7/26) are inoculated on a moving bed granular filter with a sand medium volume of 750 l. Bacteria are cultured in a container and diluted to a concentration of about $10^6$ ml. This solution is used to inoculate the moving bed granular filter in batch. Afterwards, nutrients are pumped over the moving bed granular filter in a concentration of 3 mg carbon source/l, 1 mg $NH_4NO_3$/l as nitrogen source and 0.05 mg orthophosphate/l of water passing the filter bed during 5 days at an inflow rate of about $10^3$ l/h. During this period, the bacterial population in the filter will increase to about $10^7$ to $10^8$ cfu (colony forming units) per gram of sand.

The sand filter is now fully inoculated and ready to treat water.

EXAMPLE 4

Treatment of Water with an Inoculated Moving Bed Granular Filter.

An inoculated moving bed granular filter such as in example 3 is used to treat 1.5 ml³ of waste water per hour.

The feed of the filter contains 5 mg carbon source/l, 1 mg NH$_4$NO$_3$/l as nitrogen source and 0.05 mg orthophosphate/l. Typically, the filter bed resistance (i.e. the increase in resistance due to the biofilm growth compared with a clean filter bed resistance) is between about 1 and 25 (H$_{act}$/H$_0$) and preferably between 1 and 5. Some process parameters are given in table 4.

TABLE 4 process parameter values in waste water, feed, filtrate and wash water

|  | pH | COD * mg/l | N mg/l | O$_2$ Mg/l | Ni ppm | Co ppm | Bact. cfu/ml |
|---|---|---|---|---|---|---|---|
| Waste water |  | 30 | 2.6 |  | 0.5 | 1.2 | 10$^4$ |
| Feed | 7.6 | 40 | 3.8 | 6 | 0.5 | 1.2 | 10$^4$ |
| Filtrate water | 8.2 | 30 | 2.4 | 0 | <0.1 | <0.1 | 10$^4$ |
| Wash water |  |  |  | 1 | 0.8 | 1.8 | 10$^6$ |

*: COD solubles.

The control of the growth of the bacteria in the filter is essential for an efficient and fully continuous system. A biodegradation of 10 mg COD1 leads theoretically to the formation of 4 mg biomass which counts for about 4.10$^6$ cfu/ml. About 100 ml washwater per 1 feed is generated. The washwater contained about 100 times more biomass which corresponds to the increase of biomass due to the addition of nutrients.

The amount of metal recovered from the washwater, after settling and dewatering was typically about 27 g Zn/kg, 8 g Cu/kg, 10 g Ni/kg, 25 g Co/kg, 5 g Al/kg and 100 g Fe/kg biomass. These values are all approximate and depend on the treated water.

What is claimed is:

1. A method of recovering materials from waste water, the method comprising steps of:

providing a moving bed granular filer, the filter comprising support material bearing viable micro-organisms;

flowing metal-laden waste water through the granular filter;

removing the metal from the waste water by capturing metals via the micro-organisms;

washing the support material by flowing washing water through the granular filter to remove a portion of the metal-laden micro-organisms; and recirculating the washed support material to the filter;

wherein metal-laden waste water is continuously supplied to the granular filter and wherein micro-organism growth is substantially equal to micro-organism loss.

2. The method of claim 1, wherein recirculation of the supporting material is adjusted to accommodate micro-organism growth.

3. The method of claim 1, further comprising a step of metal recovery.

4. The method of claim 1, wherein the supporting material comprises sand.

5. The method of claim 1, wherein the micro-organism growth is regulated by means comprising feed.

6. The method of claim 5, wherein said feed comprises at least one of a nitrogen source, a carbon source and a phosphate source.

7. The method of claim 1, wherein the micro-organisms are strains selected from *Alcaligenes eutrophus* CH34, *Alcaligenes eutrophus* ER121, *Pseudomonas mendocina* AS302, Citrobacter sp. N14, Arthrobacter sp. BP7/26 and BP7/15, Methylobacillus MB127 and a mixture thereof.

8. The method of claim 1, further comprising a step of biotransformation.

* * * * *